United States Patent Office 3,324,163
Patented June 6, 1967

3,324,163
PREPARATION OF HALOGENATED THIO-CARBOXYLIC ACID ESTERS
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Jan. 8, 1964, Ser. No. 336,344
8 Claims. (Cl. 260—455)

This application is a continuation-in-part of our co-pending application Ser. No. 735,702, for "Halogenated Organic Compounds," filed May 16, 1958, now abandoned.

This invention relates to a new method for preparing halogenated thiolesters.

In accordance with the present invention, a new one-step method has been found for preparing halogenated thio-carboxylic acid esters by the reaction of halogenated, and especially highly fluorinated, halosulfates with mercaptans composed solely of carbon, hydrogen and sulfur, the sulfur atoms being only in the mercapto group. In many instances, particularly in the case of high halogenated thiolesters, the method of the invention provides a simpler and more economical method of preparation. According to conventional procedures, it is often necessary to prepare and isolate the carboxylic acid, and then convert the acid to an acyl halide which is finally reacted with mercaptan to produce the desired thiolester. In accordance with this invention, the thiolester is prepared directly through a unique one-step reaction from a corresponding halogenated halosulfate.

The method of the invention may be illustrated by the reaction of a perfluoroalkylchlorosulfate, e.g., $$CF_3CF_2CF_2OSO_2Cl$$

with ethyl mercaptan to produce the perfluorinated thiolester

in accordance with the following:

$$CF_3CF_2CF_2OSO_2Cl + 3CH_3CH_2SH \longrightarrow$$
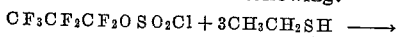
$$CF_3CF_2\overset{O}{\overset{\|}{C}}-SC_2H_5 + 2HF + HCl + (C_2H_5S)_2SO$$

As may be seen, the reaction proceeds (from a formal standpoint) through the elimination of the halosulfate group and the conversion of the adjacent $CF_2$ group to the thiolester group

While the invention is neither limited to, nor depends upon, any particular reaction mechanism, it is believed that it proceeds according to the following:

$$CF_3CF_2CF_2OSO_2Cl + 2C_2H_5SH \rightarrow$$
$$[CF_3CF_2CF_2OH] + (C_2H_5S)_2SO_2 + HCl$$

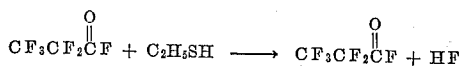

In accordance with the above, the mercaptan first reacts with the halosulfate to form the unstable α,α-dihalo alcohol. This intermediate then loses HF to produce the acyl halide. The acyl halide in the presence of an excess of mercaptan reacts further to produce the thiolester and another mole of HF.

Regardless of the validity of the above postulated reaction mechanism, it has been found that the reaction of the invention is unique to halosulfates in which the α-carbon atom (i.e., the carbon to which the halosulfate group is attached) is dehalogenated. For example, where the α-carbon atom is dihydrogenated (i.e., halosulfates of the type $RCH_2OSO_2X$ where X is chlorine or fluorine), or where the α carbon is only monohalogenated as in halosulfates of the type $RCHXOSO_2X$ where X is chlorine or fluorine, the thiolester does not form.

The halosulfates used as starting materials in the present invention includes chlorosulfates and fluorosulfates of the general formula $RCX_2OSO_2X$ where X is fluorine or chlorine and where R is a halocarbon radical in which the halogens are preferably fluorine and/or chlorine. Preferred are halosulfates in which R is at least half halogenated (i.e., the ratio of halogen to carbon atoms is at least 1:1) and particularly those in which R is at least half fluorinated. If desired, R may contain various functional groups unreactive with mercaptans such as nitro, alkoxy, nitrile or the like. The number of carbon atoms contained in the radical R is not critical as will be illustrated in the examples which follow, but in most practical applications, R will contain from 1 to 100 and more usually from 1 to 50 carbon atoms.

In the halosulfate starting materials, the sulfur of the halosulfate groups is linked to the carbon atom in the $-CX_2-$ group through an oxygen atom. These halosulfates thus have the structure

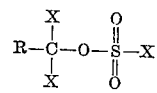

rather than the sulfonyl halide structure

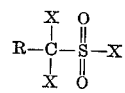

or the sulfonic acid structure

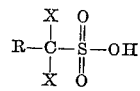

where the sulfur is connected directly to a carbon atom.

A class of halosulfates which are particularly valuable as starting materials are those in which the radical R in the formula given above is a perfluoroalkyl, a perfluorochloroalkyl, a perfluorohydroalkyl, or a perfluorochlorohydroalkyl radical. As used herein, the term perfluoro, as applied to radicals or compounds, means a radical or compound containing only fluorine and carbon. The term perfluorochloro denotes radicals or compounds containing only fluorine, chlorine and carbon in which the ratio of fluorine to chlorine atoms is at least 1:1. Perfluorohydro denotes compounds or radicals containing only fluorine, hydrogen and carbon in which the ratio of fluorine to hydrogen atoms is at least 1:1. The term perfluorochlorohydro denotes compounds or radicals containing only fluorine, chlorine, hydrogen and carbon in which the ratio of fluorine plus chlorine atoms to hydrogen atoms is at least 1:1. The valuable highly halogenated thiolesters prepared from these preferred classes of halosulfates according to the invention are often difficult to prepare by other procedures.

The new method of the invention may be used for the preparation of polythiolesters (i.e. thiolesters containing two or more thiolester groups) as well for the preparation of monothiolesters. In this case, a polyhalosulfate (i.e. a halosulfate containing 2 or more halosulfate groups) is used as the starting material and reacted with a monothiol or a polythiol. A dihalosulfate, for example reacted with a monothiol will produce a dithiolester, whereas a dihalosulfate reacted with dithiol, e.g. pentamethylene dimercaptan will produce a polyester.

The polyhalosulfate starting materials useful in the present invention are included within the scope of the general formula RCX₂OSO₂X where X and R are as defined above. In the case of the polyhalosulfates, the halocarbon radical R will contain one or more additional —CX₂OSO₂X groups as in the dihalosulfate ClO₂SOCF₂—[CF₂]₃—CF₂OSO₂Cl A preferred class of polyhalosulfates useful as starting materials in the present invention are the dihalosulfates, particularly those of the general formula

XO₂SOCX₂—R³—CX₂OSO₂X where X is fluorine or chlorine and where R³ is an alkylene radical from the class consisting of perfluoro, perfluorochloro, perfluorohydro, or perfluorochlorohydro alkylene radicals. Preferably, the radical R³ will contain from 1 to 20 and particularly from 1 to 10 carbon atoms.

The halosulfate starting materials may be prepared by the reaction of a corresponding iodide RCX₂I with chlorosulfonic or fluosulfonic acid following the procedures described in detail in our copending application Ser. No. 310,500, filed Sept. 20, 1963, for Method for the Production of Halogenated Organic Compounds, now U.S. Patent No. 3,254,107. The reaction between the iodide and the acid is carried out at temperatures ranging from —20 to 300° C. depending upon the particular iodide. The reaction is preferably carried out in the presence of a large excess of the acid. Reaction pressure is not critical and, where the iodide is not a volatile compound, the reaction is most conveniently carried out at atmospheric pressure. Reaction time is likewise not critical and will be adjusted in accordance with the reactivity of the particular iodide. Excess chlorosulfonic or fluosulfonic acid may be removed by pouring the reaction mixture over crushed ice whereupon the halosulfate, being generally water insoluble, will separate as a lower organic layer. Where the halosulfate reaction product and the halosulfonic acid are immiscible, isolation of product is effected by simple phase separation.

A class of halosulfate starting materials of particular interest and value are those prepared from telomers of halogenated olefins, particularly telomers of tetrafluoroethylene, chlorotrifluoroethylene and vinylidene fluoride. The telomer iodides of such olefins may be prepared by known procedures and then converted to halosulfates to produce telomer halosulfates such as those of the formulae: R[CF₂CF₂]ₙOSO₂X; R[CF₂CFCl]ₙOSO₂X; and R[CH₂CF₂]ₙOSO₂X where R is a halocarbon radical as defined above and where n is an integer ranging from 1 to about 40.

Typical halosulfates that may be reacted with mercaptans in accordance with the invention are the following:

CF₃CF₂OSO₂Cl
CF₃CF₂CF₂OSO₂Cl
CF₃CF₂CF₂OSO₂F
CF₂ClCF₂OSO₂Cl
CFCl₂CF₂OSO₂Cl
CF₂ClCFClOSO₂Cl
CF₂ClCFClOSO₂F
CF₂BrCFClOSO₂Cl
CF₃CF₂CF₂CF₂OSO₂Cl
CF₂ClCCl₂OSO₂Cl
CHF₂CF₂OSO₂Cl
CHF₂CFClOSO₂Cl
CF₃CH₂CF₂OSO₂Cl
CF₂ClCH₂CF₂OSO₂Cl
C₃F₇CH₂CF₂OSO₂Cl
CF₂ClCFClCH₂CF₂OSO₂Cl
CFCl₂CF₂CH₂CF₂OSO₂Cl

C₇F₁₅CH₂CF₂OSO₂Cl

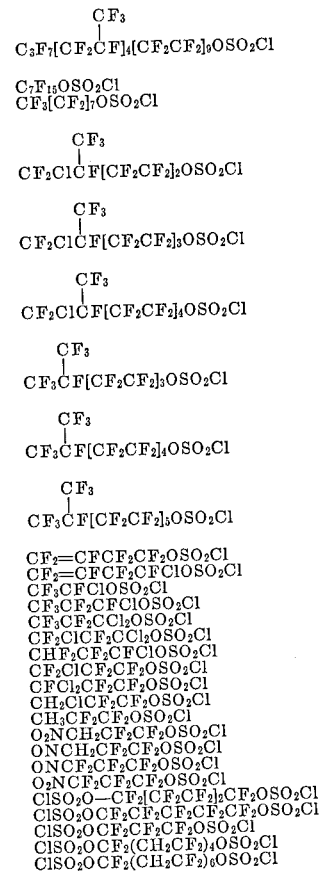

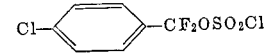

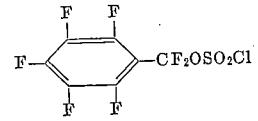

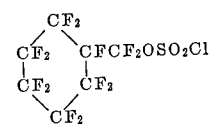

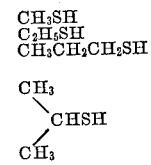

In general, primary mercaptans (i.e. mercaptans containing the —CH₂SH group), and secondary mercaptans (i.e. mercaptans containing the >CHSH group) will react with the specified class of halosulfates to form thiolesters. Preferably, the mercaptan is a primary or secondary alkyl mercaptan of the formula R'CH₂SH or

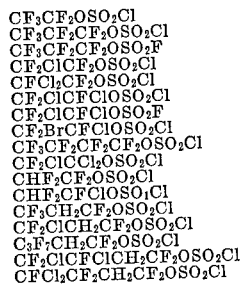

where R¹ and R² are hydrogen or alkyl groups preferably having from 1 to about 12 carbon atoms. However, arylalkyl mercaptans, i.e. mercaptans where R¹ and/or R² are aryl groups such as benzyl or the like (for example, benzyl mercaptan) may also be employed.

The following mercaptans are typical of those useful in the process of the invention:

CH₃SH
C₂H₅SH
CH₃CH₂CH₂SH

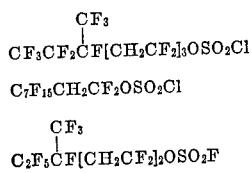

CH₃CH₂CH₂CH₂SH
n-C₈H₁₇SH
n-C₁₂H₂₅SH
C₆H₅CH₂SH
cyclic C₆H₁₁CH₂—SH
CH₂ClCH₂CH₂SH
HSCH₂CH₂CH₂CH₂CH₂SH The reaction between the halosulfate and the mercaptan may be carried out over a wide range of temperatures, including temperatures as low, e.g. as −20° C. and up to about +300° C. In general, temperatures from about 0° C. to about 100° C. will be found preferable. The optimum temperature for any particular pair of reactants may be readily chosen by simple experiment. The reaction is exothermic in nature and in some cases it may be desirable to cool the reaction mixture while the reaction is taking place.

Pressure is not a critical factor, and while the reaction is generally carried out most conveniently at atmospheric pressure, if desired sub-atmospheric or super-atmospheric pressures may be used.

The reaction time likewise is not critical and may vary considerably depending principally upon the reactivity of the particular pair of reactants chosen. The primary mercaptans generally react more readily. The relatively long chain halosulfates may react somewhat more slowly than the shorter chain halosulfates requiring somewhat longer reaction periods. Depending upon such factors, the reaction may be complete in the matter of a few minutes or on the other hand may take several hours or days to achieve relatively high conversions.

Generally it will be desirable to employ an excess of the mercaptan in order to insure a high conversion of the halosulfate. A stoichiometric excess of the mercaptan however is not necessary and in some cases it may be desirable to employ the halosulfate in excess.

In most cases, the reaction is preferably carried out under essentially anhydrous conditions in order to avoid hydrolysis of the halosulfate to a carboxylic acid and other complicating side reactions. The halosulfate and the mercaptan may be mixed directly or the reaction may be carried out in the presence of a solvent such as diethyl ether, dimethoxy ethane ($CH_3OCH_2CH_2OCH_3$), hydrocarbon solvent such as hexane, heptane, octane, benzene, toluene or xylene; chlorinated hydrocarbon solvents such as methylene chloride, chloroform or chlorofluorinated hydrocarbons such trichlorotrifluoroethane. If desired an acid acceptor such as pyridine may be added to the reaction mixture to neutralize acid halides given off during the reaction. The by-products of the reaction, in addition to hydrogen halides, include S,S′-dialkyldithiosulfates

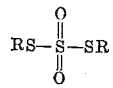

which may be separated from the thiolester by distillation or other suitable procedures.

The following examples illustrate several specific embodiments of the invention.

*Example 1.—Thiol esterification of $C_3F_7OSO_2Cl$*

To 0.01 mole of $C_3F_7OSO_2Cl$ is added an excess of ethyl mercaptan, and the mixture is allowed to reflux for 1 hour. After washing the product with aqueous sodium bicarbonate, drying with anhydrous calcium sulfate, and distilling, a high yield of ethyl thiolpentafluoropropionate,

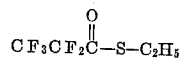

having a boiling point of 103° C. at 760 mm. Hg is obtained.

*Example 2.—Thiol esterification of*
$CF_3CF_2CF_2CF_2OSO_2Cl$

*with ethyl mercaptan*

The chlorosulfate $CF_3CF_2CF_2CF_2OSO_2Cl$ is added slowly to an excess of ethyl mercaptan, and the mixture is then refluxed for about one and one-half hours. The product is washed with aqueous sodium bicarbonate and then dried with anhydrous calcium sulfate. Upon distillation there is obtained a good yield of ethyl thiolheptafluorobutyrate having a boiling point of 119° C. at 760 mm. Hg.

*Example 3.—Thiol esterification of*

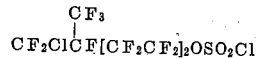

A solution containing 13.5 grams (0.14 mole) of n-butyl mercaptan, 11.0 grams (0.14 mole) of pyridine, and 35 milliliters of anhydrous diethyl ether is added drop by drop to an ice-cold solution of 26.0 grams (0.05 mole) of

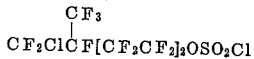

in 50 milliliters of diethyl ether. A vigorous reaction takes place during the addition period of one and one-half hours. The mixture is then refluxed for 5 hours. A white crystalline precipitate is filtered off. The filtrate consists of two layers. The lower layer is washed with hot diethyl ether and the washings are added to the upper ether layer. The upper layer is then washed with 150 milliliters of a 5% aqueous solution of sodium bicarbonate followed by washing with 150 milliliters of distilled water. It is then dried with anhydrous magnesium sulfate and the ether evaporated. The straw-colored oily liquid residue is distilled at a pressure of 10 mm. Hg to produce 23 grams of a product boiling at 101–110° C. This product is shown by infrared spectra and elemental analysis to consist of the thiolester

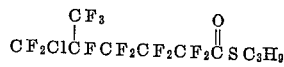

containing a small amount of a byproduct, S,S′-dibutyldithiosulfate

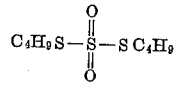

Upon redistillation, there is produced a fraction boiling at 110° C. at 10 mm. Hg. This is identified as the thiolester by comparison with an authentic sample prepared by the reaction of the acid fluoride.

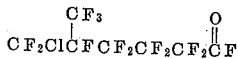

with n-butyl mercaptan. B.P. 111° C. at 10 mm. Hg, $n_D^{27}$ 1.3784.

*Analysis.*—Calculated for $C_{11}H_9ClF_{12}OS$: C, 29.2; H, 2.00; Cl, 7.83; S, 7.08. Found: C, 29.0; H, 2.03; Cl, 7.76; S, 7.43.

The infrared spectrum of the thiolester has the characteristic stretching vibration wave length for thiolesters of perfluorocarboxylic acids at 5.88μ. The ultraviolet spectrum in ethanol has a maximum of 248.5 mμ probably associated with the sulfur-carbonyl conjugation involving contributions from the ionic resonance structure in the excited state, i.e.,

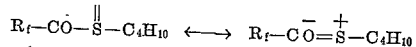

The fact that this band is displaced approximately 17 mμ to the red end of the spectrum with respect to hydrocarbon thiolesters, e.g. ethyl thiolacetate (in alcohol) has a maximum at 232 mμ is consistent with the progressive shifts toward the red portion of the spectrum displayed on stepwise replacement of the three hydrogen atoms of the acetyl group by chlorine in cyclohexylthiolacetates.

*Example 4.—Thiol esterification of*

Following the procedures described in Example 3, the chlorosulfate

$$CF_3CF[CF_2CF_2]_3OSO_2Cl$$
(with CF$_3$ branch)

is reacted with a 5 molar excess of n-octyl mercaptan. The perfluoroalkyl thiolester

$$CF_3CF[CF_2CF_2]_2CF_2\overset{O}{\overset{\|}{C}}-SC_8H_{17}$$

is obtained in good yield.

*Example 5.—Preparation of the dithiolester of $C_3F_7OSO_2Cl$*

$C_3F_7OSO_2Cl$ is treated with an excess of pentamethylene dimercaptan $HSCH_2CH_2CH_2CH_2CH_2SH$ at 50° C. After washing the product with aqueous sodium bicarbonate, drying with anhydrous calcium sulfate, and distilling, a high yield of the dithiolester

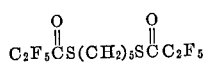
$$C_2F_5\overset{O}{\overset{\|}{C}}S(CH_2)_5S\overset{O}{\overset{\|}{C}}C_2F_5$$

is obtained having a boiling point of 128° C. at 8 mm. Hg.

*Example 6.—Preparation of the dithiolester of $C_2F_5CF(CF_3)(CH_2CF_2)_3OSO_2Cl$*

Following the procedure described in Example 5, the chlorosulfate $C_2F_5CF(CF_3)(CH_2CF_2)_3OSO_2Cl$ is reacted with pentamethylene dimercaptan at 50° C. to give the dithiolester

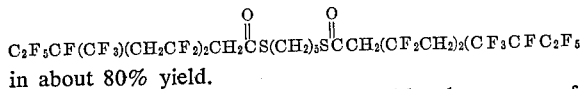
$$C_2F_5CF(CF_3)(CH_2CF_2)_2CH_2\overset{O}{\overset{\|}{C}}S(CH_2)_5S\overset{O}{\overset{\|}{C}}CH_2(CF_2CH_2)_2(CF_3CFC_2F_5)$$

in about 80% yield.

The halogenated thiolesters prepared by the process of the invention are useful, for example as lubricants (particularly the dithiolesters) having excellent load-carrying properties. They are also useful as plasticizers for synthetic resins, particularly sulfur containing resins. The polythiolesters which may be prepared by the process of the invention by reaction of polythiols with polyhalosulfates are useful plastics, particularly for film and fiber forming, especially those containing repeating $(CH_2CF_2)$ units.

We claim:
1. A method for preparing halogenated thio-carboxylic acid esters which comprises reacting a compound selected from the class consisting of primary and secondary mercaptans composed solely of carbon, hydrogen and sulfur, the sulfur atoms being only in the mercapto group, with a halogenated halosulfate of the formula $RCX_2OSO_2X$ where R is halocarbon radical wherein the halogen substituents of R are selected from the group consisting of fluorine, chlorine and bromine, and where X is selected from the class consisting of chlorine and fluorine.

2. A method in accordance with claim 1 in which R is at least half halogenated such that the ratio of halogen atoms to carbon atoms therein is at least 1:1.

3. A method for preparing halogenated thio-carboxylic acid esters which comprises reacting a primary or secondary mercaptan from the class consisting of

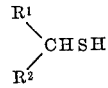
$$\underset{R^2}{\overset{R^1}{\diagdown}}CHSH$$

where $R^1$ and $R^2$ are independently selected from the group consisting of hydrogen, alkyl, cycloalkyl and aryl, and alkylene dimercaptan, with a halogenated halosulfate from the group consisting of $RCX_2OSO_2X$ and $XO_2SOCX_2-R^3-CX_2OSO_2X$ where X is selected from the class consisting of chlorine and fluorine, R is selected from the class consisting of perfluoroalkyl, perfluorochloroalkyl, perfluorohydroalkyl and perfluorochlorohydroalkyl, and $R^3$ is selected from the class consisting of perfluoroalkylene, perfluorochloroalkylene, perfluorohydroalkylene and perfluorochlorohydroalkylene.

4. A method in accordance with claim 3 in which said mercaptan is a primary mercaptan.

5. A method in accordance with claim 3 in which said mercaptan is a secondary mercaptan.

6. A method in accordance with claim 3 in which said mercaptan is an alkyl mercaptan.

7. A method for preparing halogenated thio-carboxylic acid esters which comprises reacting a primary alkyl mercaptan with a halogenated halosulfate of the formula $RCX_2OSO_2X$ where R is a radical selected from the class consisting of perfluoroalkyl, perfluorochloroalkyl, perfluorohydroalkyl and perfluorochlorohydroalkyl radicals and where X is selected from the class consisting of chlorine and fluorine.

8. A method in accordance with claim 7 in which said halosulfate is a chlorosulfate.

No references cited.

CHARLES B. PARKER, *Primary Examiner.*
DELBERT R. PHILLIPS, *Assistant Examiner.*

UNITED STATES PATENT OFFICE
CERTIFICATE OF CORRECTION

Patent No. 3,324,163                          June 6, 1967

Murray Hauptschein et al.

It is hereby certified that error appears in the above numbered patent requiring correction and that the said Letters Patent should read as corrected below.

Column 1, line 24, for "high" read -- highly --; lines 46 and 47, the formula should appear as shown below instead of as in the patent:

column 3, line 64, for "$CHF_2CFClOSO_1Cl$" read -- $CHF_2CFClOSO_2Cl$ --; column 6, lines 35 and 36, the formula should appear as shown below instead of as in the patent:

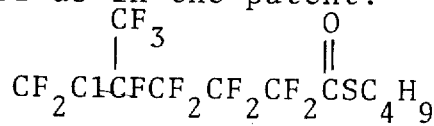

column 7, lines 31 and 32 for the right-hand portion of the formula reading $(CF_3CFC_2F_5$          read          $(CF_3)CFC_2F_5$ Signed and sealed this 9th day of January 1968.

(SEAL)
Attest:

EDWARD M. FLETCHER, JR.                EDWARD J. BRENNER
Attesting Officer                        Commissioner of Patents